July 26, 1955 C. NELSON, JR 2,714,022
SEAL FOR ANTI-FRICTION BEARINGS
Filed Aug. 19, 1950
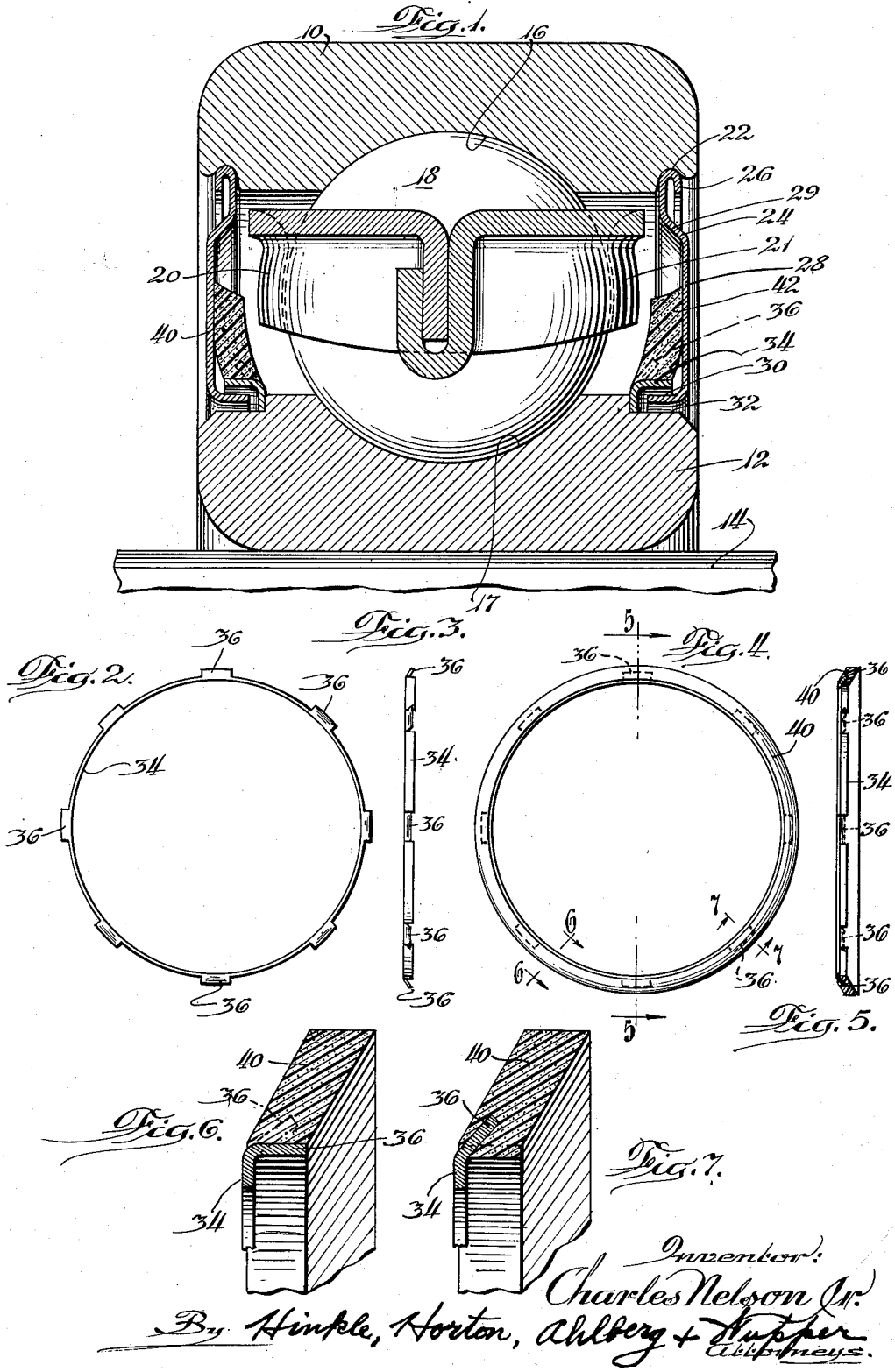

United States Patent Office 2,714,022
Patented July 26, 1955

2,714,022

SEAL FOR ANTI-FRICTION BEARINGS

Charles Nelson, Jr., Chicago, Ill., assignor to Ahlberg Bearing Company, Chicago, Ill., a corporation of Illinois Application August 19, 1950, Serial No. 180,437

4 Claims. (Cl. 286—5)

My invention relates generally to anti-friction bearings, and more particularly to means for sealing such bearings against the escape of lubricant and the entrance of foreign matter.

Oil seals for anti-friction bearings present a problem in that it is desirable that the seal be effective to retain the grease or other lubricant contained between the races of the anti-friction bearing, but that it shall not impose an appreciable friction load upon the bearing. If the seal frictionally engages one of the rotating parts of the bearing assembly it is, of course, subject to wear, and in use produces an undesirable heating effect. On the other hand, it is highly desirable that the seal absolutely preclude the escape of lubricant from the bearing assembly and prevent admission of particles of dust, dirt, and water which might interfere with the proper operation of the bearing.

It is therefore an object of my invention to provide an improved seal for anti-friction bearings which, when the shaft for which the bearing is provided is being rotated, does not impose a substantial frictional load but which nevertheless operates very effectively to seal the bearing against loss of lubricant when the bearing is not in use, the arrangement being such that the lubricant is maintained within the bearing assembly during rotation of the shaft or other part by the action of centrifugal force.

A further object is to provide an improved seal for anti-friction bearings, which is simple in construction, may be economically manufactured, and which will have a long useful life.

Other objects will appear from the following description, reference being had to the accompanying drawings, in which Fig. 1 is an enlarged fragmentary sectional view of an anti-friction bearing including the improved seal;

Fig. 2 is a plan view of the seal supporting ring;

Fig. 3 is a side elevational view of the seal supporting ring;

Fig. 4 is a plan view of the combined seal and its supporting ring;

Fig. 5 is a sectional view of the seal and ring, taken on the line 5—5 of Fig. 4; and Figs. 6 and 7 are greatly enlarged fragmentary sectional views, taken on the line 6—6 and 7—7 respectively, of Fig. 4.

The anti-friction bearing in which the improved seal is incorporated comprises an outer race ring 10 and an inner race ring 12, the latter being secured to a shaft 14 for rotation therewith by set screws, a key, or any other suitable means. The rings 10 and 12 are provided with the usual raceway grooves 16 and 17 respectively, for a plurality of hardened steel balls 18 which are maintained in proper spaced position circumferentially by a cage comprising interlocked ring-shaped members 20 and 21 suitably conformed to receive the balls 18 in spaced relation and to engage the latter loosely so as not to impose any material frictional load as the balls roll between the raceways.

The outer race 10 is provided at each end with an undercut groove 22 for the reception of a closure plate 24. This plate has a U-shaped bead 26 along its outer peripheral edge, and is joined to a flat midportion 28 by a conical portion 29 and has an inturned flange 30 along its inner edge.

The raceway 12 has a counterbored groove 32 formed at each end thereof for the reception of a seal supporting ring 34 which is generally angle-shaped in cross section, but has a plurality of lugs 36 extending outwardly at an angle therefrom. It will be noted that the flange 30 of the plate 24 fits closely between the ring 34 and the inner race ring 12 to form a labyrinth passageway.

A lubricant seal 40 made of a suitable synthetic rubber compound which is durable and resistant to deterioration by the constituents of various lubricants, is molded and bonded to the ring 34, the angular projections 36 of this ring assuring that the seal 40 is firmly anchored to the ring 34 in the position shown in Figs. 6 and 7, that is, extending radially outwardly from the ring at an angle to the plane of the ring. The ring 34 fits in the counterbored groove 32 with a press fit, while the closure plate 24 is expanded into the undercut groove 22 of the outer race 10 by deforming it, either by pressing the bead portion 26 outwardly or by applying pressure to the midportion 28 of the plate to deform the conical portion 29 thereof, and thus effectively increasing the outer diameter of the closure plate so that it will engage within the groove 22 substantially throughout the periphery of the plate.

The sealing member 40 is originally of the shape in which it is best shown in Figs. 6 and 7, that is, in the form of a frustum of a hollow right circular cone, the surfaces of which have parallel generating lines, but upon assembly in the bearing it is deformed to the shape in which it is shown in Fig. 1, wherein a substantial portion of its inner originally conical surface is pressed flat against the inner surface of the closure plate 28 to provide a large contact surface 42. However, when the shaft 14 is rotating at high speed, due to the action of centrifugal force the pressure of the sealing member 40 against the inner surface of the closure plate 24 is substantially reduced; in fact, the member 40 may actually pull away from the plate 24. However, during the time that the shaft 14 is rotating rapidly, there is very little tendency of the lubricant to leak past the seal 40, because the centrifugal force also acts upon the lubricant and tends to throw the latter outwardly toward the outer race 10. Thus, while the bearing is in use, the sealing members 40 do not impose appreciable friction, if any, against relative rotation of the inner and outer race rings, but on the other hand, when the bearing is not in use, the inherent elasticity of the material of which the sealing members 40 are made, causes them to press against the inner surface of the retaining plates 24, thereby completely to seal the ballbearing assembly against the entrance of foreign matter, as well as to prevent the escape of lubricant.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. A seal for an anti-friction bearing assembly having spaced relatively rotatable inner and outer raceways comprising an annular closure plate secured in the outer raceway and having a cylindrical flange at its inner edge, a supporting ring secured to the inner raceway, said supporting ring having a flanged portion extending around and substantially parallel to the flange portion of the closure plate, and a lubricant sealing member secured to the outer surface of the flange of the supporting ring, said sealing member when unstressed being in the shape of the frustum of a hollow right circular cone the surfaces of which have parallel generating lines, said sealing member being made of a lubricant resistant synthetic rubberlike material which is flexible and elastic and which is deformed to engage the inner surface of the closure plate throughout a substantial area.

2. In a seal for use in an anti-friction bearing assembly of the type having an inner race ring, the combination comprising, a supporting metallic ring having a circular portion adapted for attachment to the inner race ring of the assembly and a cylindrical flange portion integral with the circular portion at the outer periphery thereof, angularly and outwardly directed lugs projecting from said cylindrical flange portion substantially at the juncture between said circular and cylindrical portions, and an annulus bonded to the outer surface of said cylindrical portion and surrounding said angularly and outwardly projecting lugs, said annulus being made of a flexible elastic rubberlike composition and shaped to extend radially outwardly from said ring at an angle to the plane of said cylindrical portion.

3. A seal for an anti-friction bearing assembly having spaced relatively rotatable inner and outer race rings comprising, an annular closure plate secured in the outer race ring and having a cylindrical flange at its inner edge projecting toward the center of the assembly, a supporting ring having a circular portion secured to the inner race ring and a cylindrical flange portion integral with said circular portion at the outer periphery thereof, said cylindrical flange portion extending around said cylindrical flange of said closure plate and projecting outwardly of the assembly to terminate at a point spaced from the closure plate, a plurality of angularly and outwardly directed lugs projecting toward said closure plate from said cylindrical flange portion substantially at the juncture between said circular portion and said cylindrical flange portion, and a lubricant sealing annulus bonded to the outer surface of said cylindrical flange portion and surrounding said angularly and outwardly projecting lugs, said annulus when unstressed being in the shape of the frustum of a hollow right circular cone the surfaces of which have parallel generating lines and extending radially outwardly from said supporting ring at an angle to the plane of said cylindrical portion, said sealing annulus being made of a lubricant resistant synthetic rubberlike material which is flexible and elastic and which is deformed to engage the inner surface of said closure plate throughout a substantial area.

4. A seal for an anti-friction bearing assembly having spaced relatively rotatable inner and outer race rings, comprising, an annular closure plate secured to each end of the outer race ring and substantially closing the ends of the annular space between the inner and outer rings, an annular rigid supporting ring secured to the inner race ring at the inside of each closure plate, each supporting ring having a substantially cylindrical flange closely adjacent but spaced from the inner race ring and projecting substantially perpendicularly toward the adjacent closure plate, and lubricant sealing members, each made of a lubricant resistant synthetic rubberlike material which is flexible and elastic, which when unstressed is in the form of a frustrum of a hollow right circular cone conical surfaces of which have parallel generating lines, the smaller diameter ends of said sealing members being bonded to said supporting ring flanges, and said supporting rings and said sealing members being positioned sufficiently close to the inner surfaces of the closure plates so as to cause said sealing members to be deformed and to contact their outer conical surfaces against the inner surfaces of the closure plates throughout a substantial area when the inner race ring is not being rotated.

References Cited in the file of this patent

UNITED STATES PATENTS

| | | |
|---|---|---|
| 1,420,416 | Dlesk | June 20, 1922 |
| 1,986,621 | Bott | Jan. 1, 1935 |
| 2,009,281 | Stein | July 23, 1935 |
| 2,144,691 | Schmal | Jan. 24, 1939 |
| 2,214,243 | Casson | Sept. 10, 1940 |
| 2,251,012 | Delaval-Crow | July 29, 1941 |
| 2,279,669 | Friskney | Apr. 14, 1942 |
| 2,341,900 | Boden | Feb. 15, 1944 |
| 2,397,847 | Dodge | Apr. 2, 1946 |
| 2,478,140 | Ulseth | Aug. 2, 1949 |
| 2,483,988 | Victor | Oct. 4, 1949 |